United States Patent
Venkataraman et al.

(10) Patent No.: US 8,468,831 B2
(45) Date of Patent: Jun. 25, 2013

(54) LEAN DIRECT INJECTION FOR PREMIXED PILOT APPLICATION

(75) Inventors: Krishnakumar Venkataraman, Simpsonville, SC (US); Manish Kumar, Bangalore (IN); Jason Thurman Stewart, Greer, SC (US)

(73) Assignee: General Electric Company, Schenectady, NY (US)

(*) Notice: Subject to any disclaimer, the term of this patent is extended or adjusted under 35 U.S.C. 154(b) by 1016 days.

(21) Appl. No.: 12/501,607

(22) Filed: Jul. 13, 2009

(65) Prior Publication Data

US 2011/0005229 A1    Jan. 13, 2011

(51) Int. Cl.
*F02C 7/22* (2006.01)
(52) U.S. Cl.
USPC ............ 60/737; 60/738; 60/734; 60/739; 60/740; 239/5; 239/399
(58) Field of Classification Search
USPC .............. 60/734, 737, 738, 739, 740, 742, 60/748; 239/5, 399
See application file for complete search history.

(56) References Cited

U.S. PATENT DOCUMENTS

| | | | |
|---|---|---|---|
| 5,049,066 A * | 9/1991 | Kaiya et al. | 431/352 |
| 5,259,184 A | 11/1993 | Borkowicz et al. | |
| 5,437,158 A | 8/1995 | Fric | |
| 5,479,781 A | 1/1996 | Fric | |
| 6,047,550 A | 4/2000 | Beebe | |
| 6,460,326 B2 * | 10/2002 | Bechtel et al. | 60/39.465 |
| 6,848,260 B2 | 2/2005 | North | |
| 6,871,501 B2 * | 3/2005 | Bibler et al. | 60/772 |
| 6,915,636 B2 * | 7/2005 | Stuttaford et al. | 60/737 |
| 7,406,827 B2 * | 8/2008 | Bernero et al. | 60/742 |
| 2002/0162333 A1 * | 11/2002 | Zelina | 60/776 |

* cited by examiner

*Primary Examiner* — Phutthiwat Wongwian
*Assistant Examiner* — Steven Sutherland
(74) *Attorney, Agent, or Firm* — Hoffman Warnick LLC; Ernest G. Cusick

(57) ABSTRACT

Embodiments of this invention provide a premixed pilot assembly for use with a fuel nozzle for a turbine. The level of nitrogen oxide (NOx) emitted by the pilot is reduced by mixing the fuel and air fast, at the end of the pilot nozzle, thereby avoiding significant zones of rich fuel and air mixtures. The air is mixed with the fuel through the use of openings in a first cylinder and a second cylinder, one of which carries air and one of which carries pilot fuel. The openings can be configured as necessary to obtain a desired effect on the pilot.

20 Claims, 6 Drawing Sheets

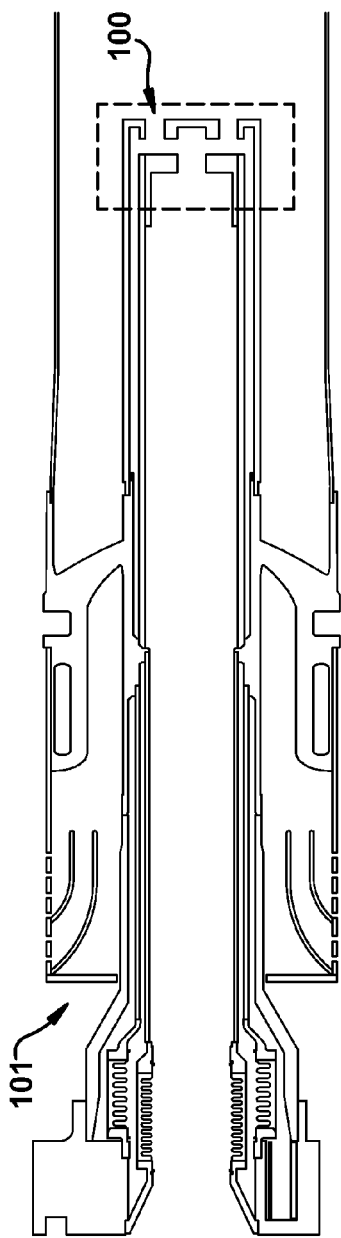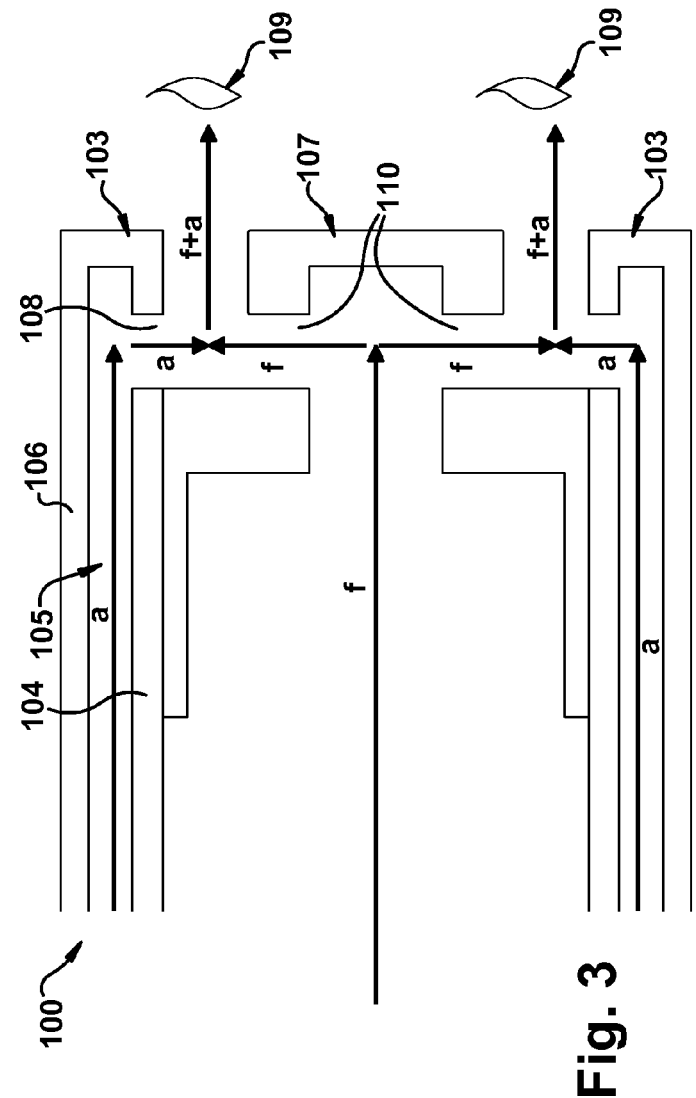

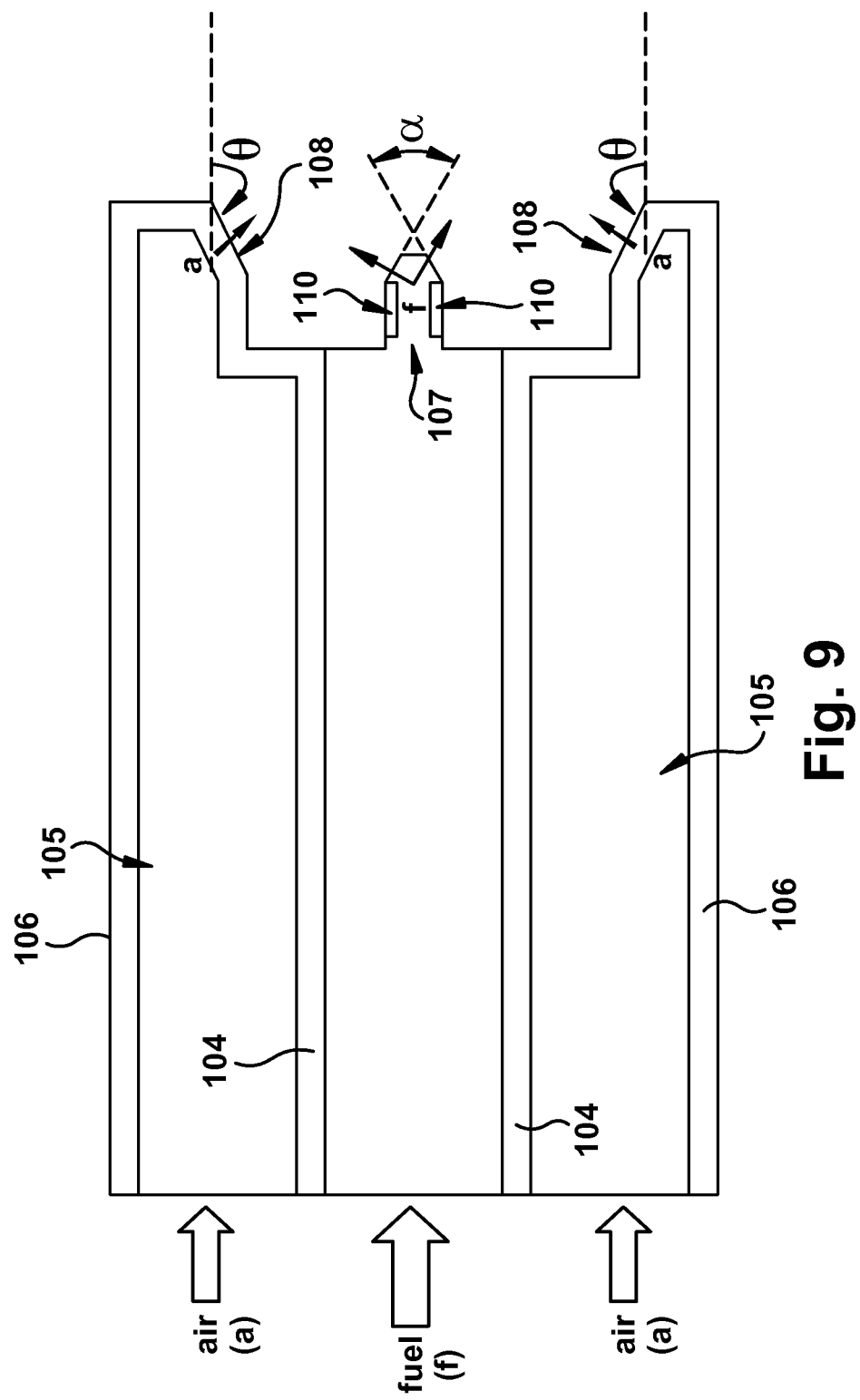

LEAN DIRECT INJECTION FOR PREMIXED PILOT APPLICATION

FIELD OF THE INVENTION

The invention relates generally to combustors for turbines. More particularly, the invention relates to a solution for using lean direct injection for premixed piloted combustion.

BACKGROUND OF THE INVENTION

Traditional gas turbine combustors use non-premixed ("diffusion") flames in which fuel and air freely enter a combustion chamber separately. However, the diffusion flames burn at such a high temperature that unacceptable levels of nitrogen oxide (NOx) are emitted.

One method used to lower NOx emissions includes using lean premixed combustion in which fuel and air are premixed in a premixer section, and the fuel-air mixture is injected into a combustion chamber where it is burned. Lean premixed combustion can result in low NOx emissions for very uniform fuel air mixtures, however, such mixtures are typically prone to combustion instability. This instability can be overcome by the presence of a pilot. However, typically a pilot results in excessive NOx formation, which therefore reduces the benefit of using the lean premixed combustion method.

BRIEF DESCRIPTION OF THE INVENTION

Embodiments of this invention provide a premixed pilot assembly for use with a fuel nozzle for a turbine. The level of NOx emitted by the pilot is reduced by mixing the fuel and air fast, at the end of the pilot nozzle, thereby avoiding significant zones of rich fuel and air mixtures. The air is mixed with the fuel through the use of openings in a first cylinder and a second cylinder, one of which carries air and one of which carries pilot fuel. The openings can be configured as necessary to obtain a desired effect on the pilot.

A first aspect of the disclosure provides a premixed pilot assembly configured to be coupled to a fuel nozzle for a turbine combustor, the premixed pilot assembly including: a first cylinder, a second cylinder, configured to hold a selected one of: pilot fuel or air, the second cylinder disposed within the first cylinder such that an annular area is formed between the first cylinder and the second cylinder, the annular area configured to allow the other one of the pilot fuel or air to flow through the annular area; a tip, coupled to the second cylinder, the tip configured to create at least one second cylinder opening to direct the selected one of the pilot fuel or the air flowing through the second cylinder radially outward; and an end piece, coupled to the first cylinder, the end piece configured to create at least one first cylinder opening to direct the other one of the pilot fuel or air flowing through the annular area radially inward towards the selected one of the pilot fuel or the air directed from the at least one second cylinder opening.

A second aspect of the disclosure provides a fuel nozzle comprising: a housing defining a main fuel nozzle; a centerbody tube, disposed within the housing; a premixed pilot assembly coupled to an end of the centerbody tube, the premixed pilot assembly including: a first cylinder, a second cylinder, configured to hold a selected one of pilot fuel or air, the second cylinder disposed within the first cylinder such that an annular area is formed between the first cylinder and the second cylinder, the annular area configured to allow the other one of the pilot fuel or air to flow through the annular area; a tip, coupled to the second cylinder, the tip configured to create at least one second cylinder opening to direct the selected one of the pilot fuel or the air flowing through the second cylinder radially outward; and an end piece, coupled to the first cylinder, the end piece configured to create at least one first cylinder opening to direct the other one of the pilot fuel or air flowing through the annular area radially inward towards the selected one of the pilot fuel or air directed out of the at least one second cylinder opening.

A third aspect of the disclosure provides a premixed pilot assembly configured to be coupled to a fuel nozzle for a turbine, the premixed pilot assembly including: a first passage for delivering one of pilot fuel or air; a second passage for delivering the other of pilot fuel or air, the first and second passages isolated from each other along a length of the passages; a first opening in the first passage to emit one of the pilot fuel or the air radially outward; and a second opening in the second passage to emit the other of the pilot fuel or the air radially inward towards one of the pilot fuel or the air emitted from the first opening.

BRIEF DESCRIPTION OF THE DRAWINGS

FIGS. 2-9 show cross-sectional views of various configurations for a premixed pilot according to embodiments of this invention.

It is noted that the drawings of the invention are not to scale. The drawings are intended to depict only typical aspects of the invention, and therefore should not be considered as limiting the scope of the invention.

DETAILED DESCRIPTION OF THE INVENTION

Figure 1:
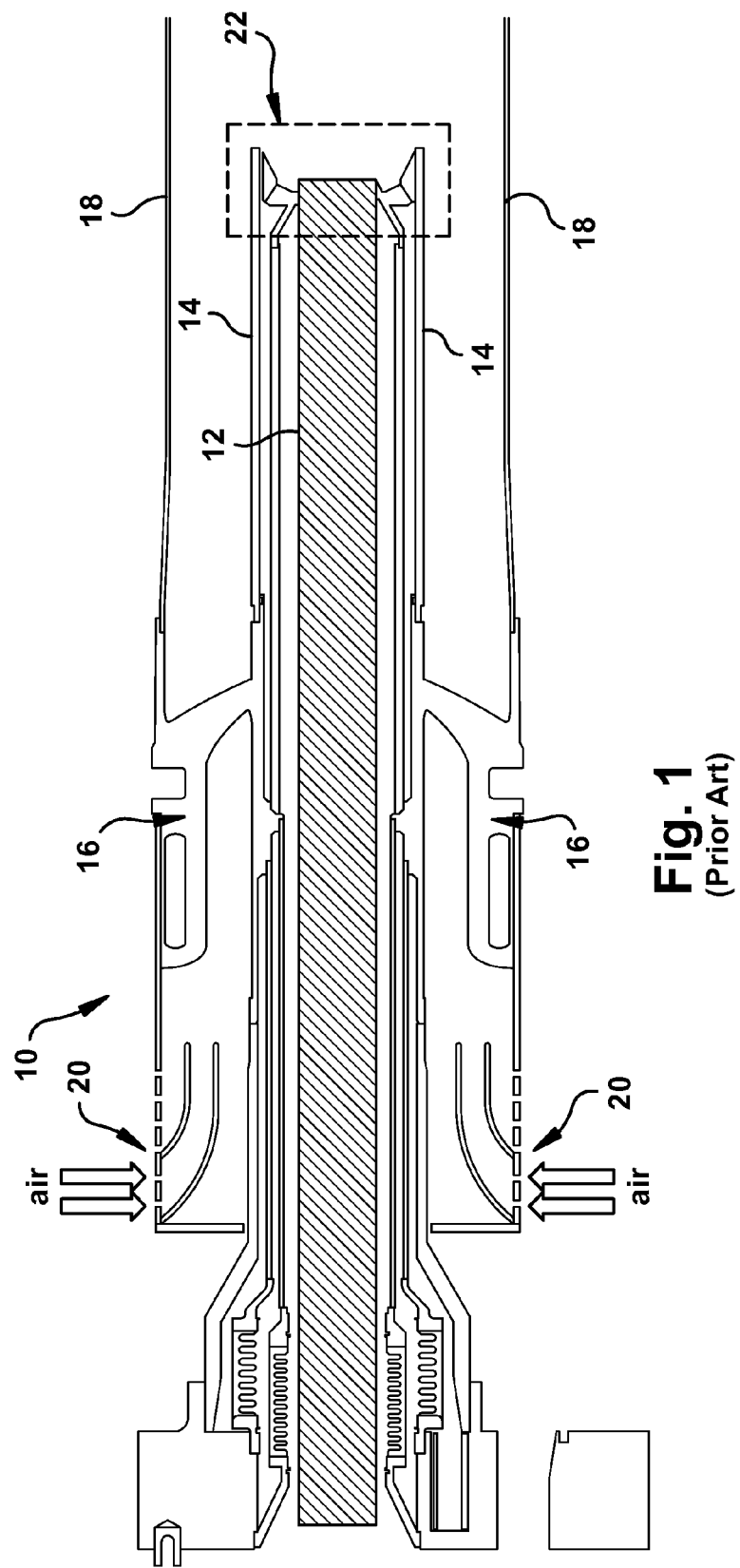
FIG. 1 shows a main fuel nozzle for a gas turbine as known in the art.
Figure 5:
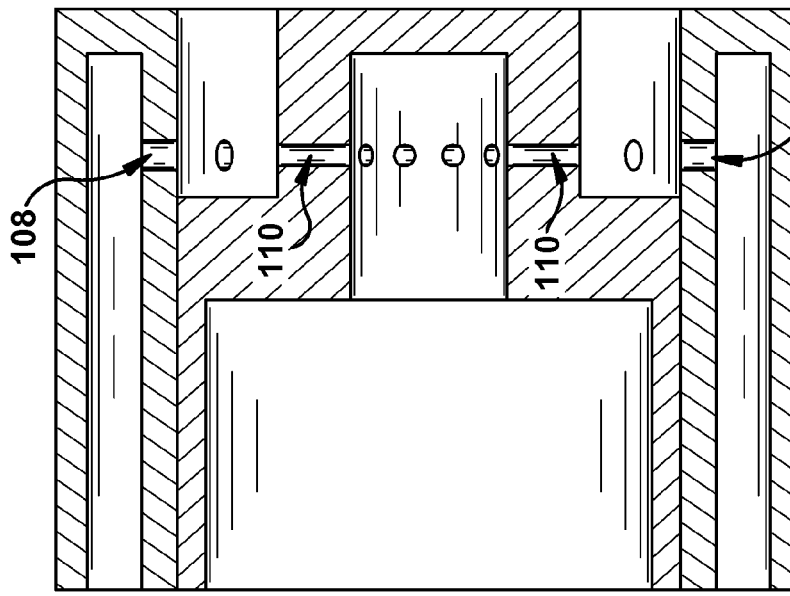
Figure 4:
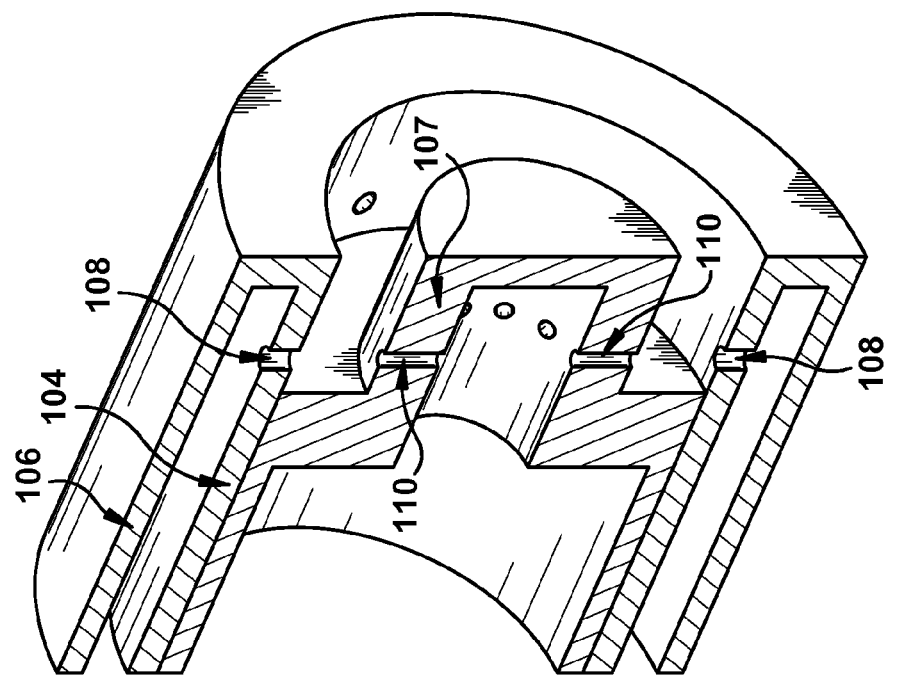
Figure 6:
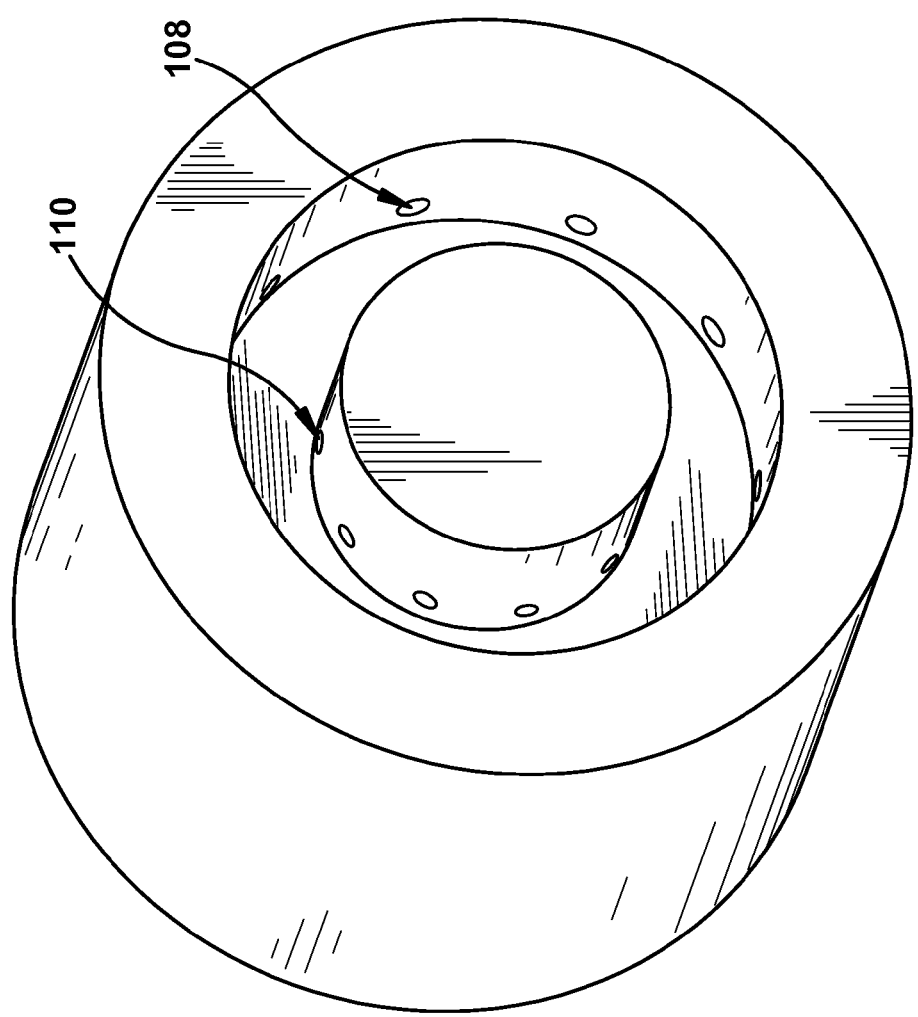

Gas turbines typically include multiple chambers for combustion, and each chamber for combustion includes multiple main fuel nozzles. One such main fuel nozzle 10, as known in the art, is shown in FIG. 1. Main fuel nozzle 10 includes a burner tube 18, with turning vanes 16, and an inlet flow conditioner (IFC) 20 through which main air enters nozzle 10. Main fuel nozzle 10 further includes a centerbody 14, which consists of a tube or cylinder disposed within main fuel nozzle 10. A liquid fuel cartridge 12 is disposed within centerbody 14. The area noted by the dotted lines in FIG. 1, at an end of centerbody 14 and liquid fuel cartridge 12, is an area referred to as a diffusion tip 22 and is typically coupled to the end of fuel nozzle 10, for example, by a weld. Embodiments of the invention discussed herein include modifying or replacing diffusion tip 22 to include a premixed pilot 100 (FIGS. 2-5).

A cross-sectional view of premixed pilot 100 incorporated into a main fuel nozzle 101 according to embodiments of this invention is shown in FIG. 2. Premixed pilot 100 can be added to main fuel nozzle 101 through any known means. For example, premixed pilot 100 can replace diffusion tip 22 (FIG. 1) or diffusion tip 22 can be modified as known in the art to include the elements of premixed pilot 100 discussed herein. For example, premixed pilot 100 can be added to an end of main fuel nozzle 10 shown in FIG. 1 and one of skill in the art could modify main fuel nozzle 10 as necessary in order to route air and fuel through premixed pilot 100, and to include liquid fuel cartridge 12 if desired. One such configuration to route air and fuel through premixed pilot 100 is shown in FIG. 2.

Turning to FIG. 3, an enlarged cross-sectional view of premixed pilot 100 is shown. Premixed pilot 100 includes a first cylinder 106 and a second cylinder 104, within first cylinder 106. As such, an annular area 105 is formed between first cylinder 106 and second cylinder 104. Cylinder 104 carries fuel while annular area 105 carries air. It is noted that while cylinders 104 and 106 are shown FIGS. 2-9 as being cylindrical in shape, one of skill in the art would understand that any suitable sized or shaped passage could be used. It is also noted that while cylinder 104 is shown in FIGS. 2-9 as being a hollow cylinder carrying fuel, one of skill in the art would understand that additional elements may be included within cylinder 104, such as additional passages or mechanical elements, in order to assist premixed pilot 100 in interacting with fuel nozzle 10.

First cylinder 106 further includes an end piece 103 which is configured to create at least one first cylinder opening 108 (also referred to as air openings) to direct the air flowing through annular area 105 radially inward. Premixed pilot 100 further includes a tip 107 at one end of second cylinder 104. Tip 107 is configured to create at least one second cylinder opening 110 (also referred to as fuel openings) to direct the pilot fuel flowing through second cylinder 104 radially outward. As such, pilot fuel emerges from second cylinder 104, through openings 110, sufficient to maintain a pilot flame 109. As discussed herein, one or more air openings 108 allow the air in annular area 105 to be injected directly at the pilot fuel emerging from fuel openings 110 in second cylinder 104. This air flow from air openings 108 is shown by the arrows marked "a" while the pilot fuel flow from fuel openings 110 is shown by the arrows marked "f." The air is injected radially inward directly at the fuel as it exits second cylinder 104. As such, the air and fuel are isolated until just as the fuel emerges from second cylinder 104, thereby avoiding significant zones of rich fuel and air mixtures. Once the air and fuel have mixed, the air and fuel mixture (shown by arrows marked "f+a") flows downstream, i.e., away from second cylinder 104 and tip 107, and will start burning approximately where pilot flames 109 are shown in FIG. 3. As such, vigorous mixing of air and fuel will occur in a mixing zone, within a short axial dimension from fuel tip 107. In addition, injecting the air at the fuel according to embodiments of this invention produces a supportive zone for stable combustion for pilot flame 109.

Openings 108, 110 may be of any shape or size to achieve a mixing of air and fuel at the desired intensity and inclination. For example, in one embodiment, shown in the three-dimensional view in FIGS. 4-6, fuel openings 110 and air openings 108 can comprise one or more discontinuous separate openings, displaced along tip 107 and second cylinder 104, respectively, each opening acting as a discrete jet to inject either the air or fuel. In another embodiment (not shown), fuel openings 110 and air openings 108 can comprise one or more continuous, annular openings around entire tip 107 and entire second cylinder 104, respectively. It is understood that any configuration of annular openings or discontinuous separate openings can be used. For example, both fuel opening 110 and air opening 108 can be continuous annular openings, or both openings 108, 110 can be discontinuous separate openings. Alternatively, fuel opening 110 can be a continuous annular ring while air openings 108 can be discontinuous separate openings, and vice versa. Regardless of whether the openings 108, 110 are continuous (annular) or discontinuous separate, openings 108, 110 can also be of any shape or geometric cross-section desired.

Figure 8:
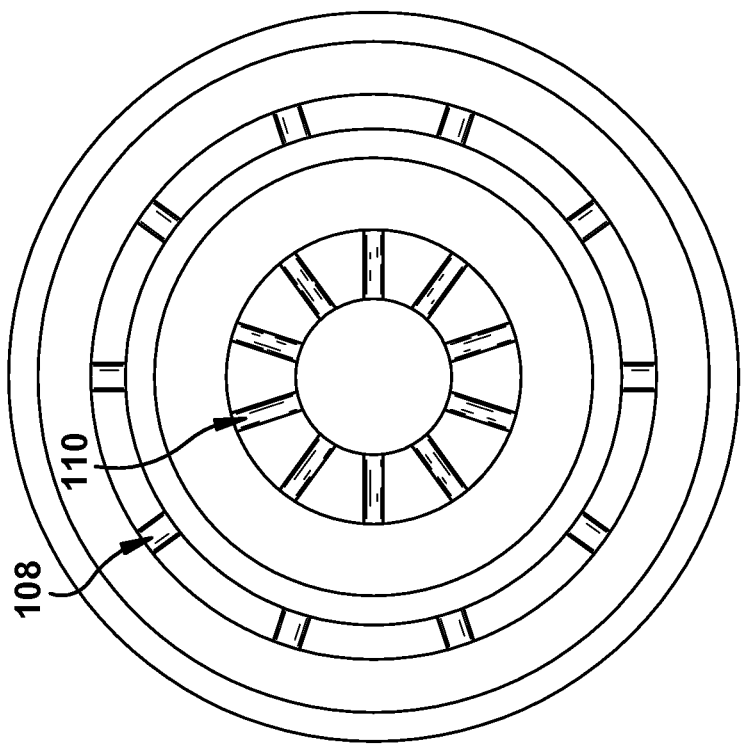
Figure 7:
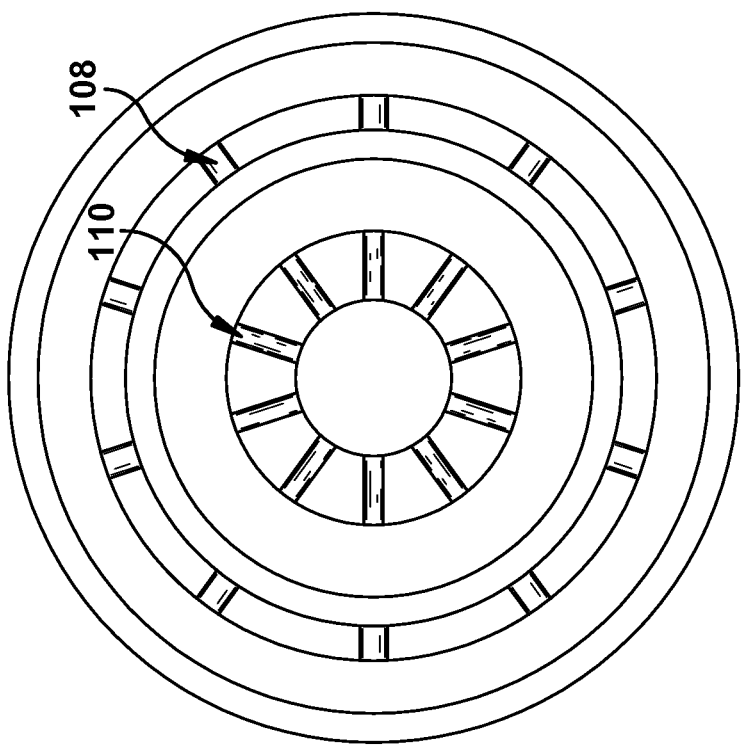

Openings 108, 110 can be configured in second cylinder 104 and tip 107 to achieve a desired level of mixing of air and fuel. For example, if openings 108, 110 are discontinuous separate openings, openings 108 can be configured to be aligned with a corresponding opening 110, as shown in FIG. 7, such that a flow of fuel directly impinges on a flow of air. Alternatively, as shown in FIG. 8, openings 108 can be configured to be staggered with respect to openings 110, such that a flow of fuel does not directly impinge on a flow of air.

While openings 108, 110 are shown in FIGS. 2-8 as directing the flow of air at the fuel substantially perpendicularly, openings 108, 110 can also be angled to achieve mixing of the air and fuel at a desired angle. For example, openings 108, 110 can be angled to direct an angled flow of air at an angled flow of fuel, or only one of the openings 108, 110 can be angled while the other opening is substantially perpendicular to cylinders 104, 106. For example, as shown in the simplified schematic in FIG. 9, angle α is the angle between two surfaces of tip 107 that include fuel openings 110, and can be in the range of approximately 0° to approximately 60°. Angle θ is the angle between a horizontal plane of cylinder 106 and a surface of air openings 108. Angle θ can be in the range of approximately 120° to approximately 180°. Although these angle ranges are provided as one example of how openings 108, 110 can be angled to achieve a desired mixing of air and fuel, it is understood that the angles provided are not intended to limit the invention disclosed herein, as any angle can be used for either openings 108 or 110 to achieve a desired result. In addition, although FIGS. 2-9 show air being injected at the fuel substantially perpendicularly or slightly downstream (i.e., away from premixed pilot 100 toward flame 109), air may also be injected upstream at the fuel.

While the embodiments discussed herein refer to second cylinder 104 holding fuel and annular area 105 formed by first cylinder 106 holding air, it is understood that the reverse is also disclosed. Second cylinder 104 can hold air, and therefore air can be directed radially outward through openings 110, while annular area 105 can hold fuel and therefore fuel can be directed radially inward through openings 108 in first cylinder 106.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A premixed pilot assembly configured to be coupled to a fuel nozzle for a turbine combustor, the premixed pilot assembly including:
   a first cylinder,
   a second cylinder, configured to hold a selected one of: pilot fuel or air, the second cylinder disposed within the first cylinder such that an annular area is formed between the first cylinder and the second cylinder, the annular area configured to allow the other one of the pilot fuel or air to flow through the annular area;
   a tip, coupled to the second cylinder, the tip configured to create at least one second cylinder opening to direct the selected one of the pilot fuel or the air flowing through the second cylinder radially outward, perpendicular to the annular area; and an end piece, coupled to the first cylinder, the end piece configured to create at least one first cylinder opening to direct the other one of the pilot fuel or air flowing through the annular area radially inward, perpendicular to the annular area, directly towards the selected one of the pilot fuel or the air directed from the at least one second cylinder opening.

2. The premixed pilot assembly of claim 1, wherein the at least one first cylinder opening comprises one or more continuous annular openings, and the at least one second cylinder opening comprises one or more continuous annular openings.

3. The premixed pilot assembly of claim 1, wherein the at least one first cylinder opening comprises one or more continuous annular openings, and the at least one second cylinder opening comprises one or more discontinuous, separate openings.

4. The premixed pilot assembly of claim 1, wherein the at least one first cylinder opening comprises one or more discontinuous, separate openings, and the at least one second cylinder opening comprises one or more continuous annular openings.

5. The premixed pilot assembly of claim 1, wherein the at least one first cylinder opening comprises one or more discontinuous, separate openings, and the at least one second cylinder opening comprises one or more discontinuous, separate openings.

6. The premixed pilot assembly of claim 5, wherein each at least one first cylinder opening is aligned with a corresponding at least one second cylinder opening.

7. The premixed pilot assembly of claim 5, wherein the at least one or more discontinuous separate openings of the first cylinder are staggered with respect to the one or more discontinuous separate openings of the second cylinder.

8. The premixed pilot assembly of claim 1, further comprising a mixing zone at which mixing of air and pilot fuel occurs.

9. The premixed pilot assembly of claim 1, wherein the at least one first cylinder opening and the at least one second cylinder opening are configured such that the air flow and the pilot fuel flow are substantially perpendicular to the annular area.

10. The premixed pilot assembly of claim 1, wherein the at least one first cylinder opening is angled such that an angle between a surface of the at least one first cylinder opening and a horizontal plane of the first cylinder is approximately 120° to approximately 180°.

11. The premixed pilot assembly of claim 1, wherein the at least one second cylinder opening comprises at least two openings, and an angle between the two openings is approximately 0° to approximately 60°.

12. A fuel nozzle comprising:
a housing defining a main fuel nozzle;
a centerbody tube, disposed within the housing;
a premixed pilot assembly coupled to an end of the centerbody tube, the premixed pilot assembly including:
a first cylinder,
a second cylinder, configured to hold a selected one of pilot fuel or air, the second cylinder disposed within the first cylinder such that an annular area is formed between the first cylinder and the second cylinder, the annular area configured to allow the other one of the pilot fuel or air to flow through the annular area;
a tip, coupled to the second cylinder, the tip configured to create at least one second cylinder opening to direct the selected one of the pilot fuel or the air flowing through the second cylinder radially outward, perpendicular to the annular area; and
an end piece, coupled to the first cylinder, the end piece configured to create at least one first cylinder opening to direct the other one of the pilot fuel or air flowing through the annular area radially inward, perpendicular to the annular area, directly towards the selected one of the pilot fuel or air directed out of the at least one second cylinder opening.

13. The fuel nozzle of claim 12, wherein the at least one first cylinder opening comprises one or more continuous annular openings, and the at least one second cylinder opening comprises one or more continuous annular openings.

14. The fuel nozzle of claim 12, wherein the at least one first cylinder opening comprises one or more continuous annular openings, and the at least one second cylinder opening comprises one or more discontinuous, separate openings.

15. The fuel nozzle of claim 12, wherein the at least one first cylinder opening comprises one or more discontinuous, separate openings, and the at least one second cylinder opening comprises one or more continuous annular openings.

16. The fuel nozzle of claim 12, wherein the at least one first cylinder opening comprises one or more discontinuous, separate openings, and the at least one second cylinder opening comprises one or more discontinuous, separate openings.

17. The fuel nozzle of claim 16, wherein each at least one first cylinder opening is aligned with a corresponding at least one second cylinder opening.

18. The fuel nozzle of claim 16, wherein the at least one or more discontinuous separate openings of the first cylinder are staggered with respect to the one or more discontinuous separate openings of the second cylinder.

19. The fuel nozzle of claim 12, further comprising a mixing zone at which mixing of air and pilot fuel.

20. A premixed pilot assembly configured to be coupled to a fuel nozzle for a turbine, the premixed pilot assembly including:
a first passage for delivering one of pilot fuel or air;
a second passage for delivering the other of pilot fuel or air, the first and second passages isolated from each other along a length of the passages;
a first opening in the first passage to emit one of the pilot fuel or the air radially outward, perpendicular to the first passage; and
a second opening in the second passage to emit the other of the pilot fuel or the air radially inward, perpendicular to the second passage, directly towards one of the pilot fuel or the air emitted from the first opening.

* * * * *